US012809922B2

(12) United States Patent
Tripathy et al.

(10) Patent No.: US 12,809,922 B2
(45) Date of Patent: Nov. 24, 2026

(54) DYNAMICALLY GENERATING A REUSABLE PROCESS MODEL OBJECT FOR A WORKFLOW INCLUDING MULTIPLE CONDITIONS AND MULTIPLE ACTIONS

(71) Applicant: INTUIT INC., Mountain View, CA (US)

(72) Inventors: Shyamalendu Tripathy, Bangalore (IN); Sandeep Gupta, Bangalore (IN); Nivedita Nayak, Bangalore (IN); Manupriyam Jindal, Bangalore (IN); Bhavishya Tolani, Bangalore (IN); Yash Agarwal, Bangalore (IN)

(73) Assignee: INTUIT INC., Mountain View, CA (US)

( * ) Notice: Subject to any disclaimer, the term of this patent is extended or adjusted under 35 U.S.C. 154(b) by 365 days.

(21) Appl. No.: 18/591,646

(22) Filed: Feb. 29, 2024

(65) Prior Publication Data

US 2025/0278280 A1 Sep. 4, 2025

(51) Int. Cl.
*G06F 16/93* (2019.01)
*G06Q 10/0633* (2023.01)

(52) U.S. Cl.
CPC ....... *G06F 16/93* (2019.01); *G06Q 10/06332* (2025.08)

(58) Field of Classification Search
None
See application file for complete search history.

(56) References Cited

U.S. PATENT DOCUMENTS 11,650,816 B2 * 5/2023 Bouley ..................... G06F 8/76 717/121
2003/0200262 A1 * 10/2003 Enomoto ................ H04L 41/50 709/205
2019/0266575 A1 * 8/2019 McAdam ......... G06Q 10/06312

* cited by examiner

*Primary Examiner* — Scott A. Waldron
(74) *Attorney, Agent, or Firm* — Patterson + Sheridan, LLP

(57) ABSTRACT

A method for dynamically generating process model objects for workflows includes: obtaining a request from a user of a software application for configuring workflows, the request being for an initial workflow including multiple conditions and multiple actions, the request including user-provided information for one or more of the multiple conditions and one or more of the multiple actions; mapping the initial workflow to a template for generating process model objects for workflows, the template comprising a single condition block to represent the multiple conditions and a single action block to represent the multiple actions; extracting the user-provided information from the request; and dynamically generating a process model object for the initial workflow based, at least in part, on the extracted user-provided information and information associated with the template.

13 Claims, 7 Drawing Sheets

DYNAMICALLY GENERATING A REUSABLE PROCESS MODEL OBJECT FOR A WORKFLOW INCLUDING MULTIPLE CONDITIONS AND MULTIPLE ACTIONS

INTRODUCTION

Aspects of the present disclosure relate to dynamically generating a process model object for a requested workflow having multiple conditions and multiple actions and then reusing the process model object when the same or similar workflow request is received in the future.

BACKGROUND

Every year millions of people around the world utilize software applications to assist with countless aspects of life. Many software applications allow users to configure workflows by which certain actions are taken under certain conditions. For example, a software application may provide automation functionality, and a user may configure such automation functionality by specifying conditions under which automated actions are to be performed.

Software applications for configuring and automating workflows support single condition, single action workflows as these workflows can, given their defined structure, be represented by a static file. However, such software applications cannot support workflows having multiple conditions and multiple actions because, unlike single condition single action workflows, workflows having multiple conditions and multiple actions do not have a defined structure and therefore cannot be represented by a static file. Furthermore, given the large volume (e.g., in the thousands) of unique complex workflows that can be requested by a user, storing and maintaining a file for every possible multi-condition, multi-action workflow is not feasible.

Therefore, there is a need for improved techniques in such software applications to support workflows having multiple conditions and multiple actions.

BRIEF SUMMARY

Aspects and advantages of embodiments of the present disclosure will be set forth in part in the following description, or may be learned from the description, or may be learned through practice of the embodiments.

A method for dynamically generating process model objects for workflows includes: obtaining a request from a user of a software application for configuring workflows, the request being for an initial workflow including multiple conditions and multiple actions, the request including user-provided information for one or more of the multiple conditions and one or more of the multiple actions; mapping the initial workflow to a template for generating process model objects for workflows, the template comprising a single condition block to represent the multiple conditions and a single action block to represent the multiple actions; extracting the user-provided information from the request; and dynamically generating a process model object for the initial workflow based, at least in part, on the extracted user-provided information and information associated with the template.

Further embodiments include a non-transitory computer-readable storage medium storing instructions that, when executed by a computer system, cause the computer system to perform the method set forth above. Further embodiments include a system comprising at least one memory and at least one processor configured to perform the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
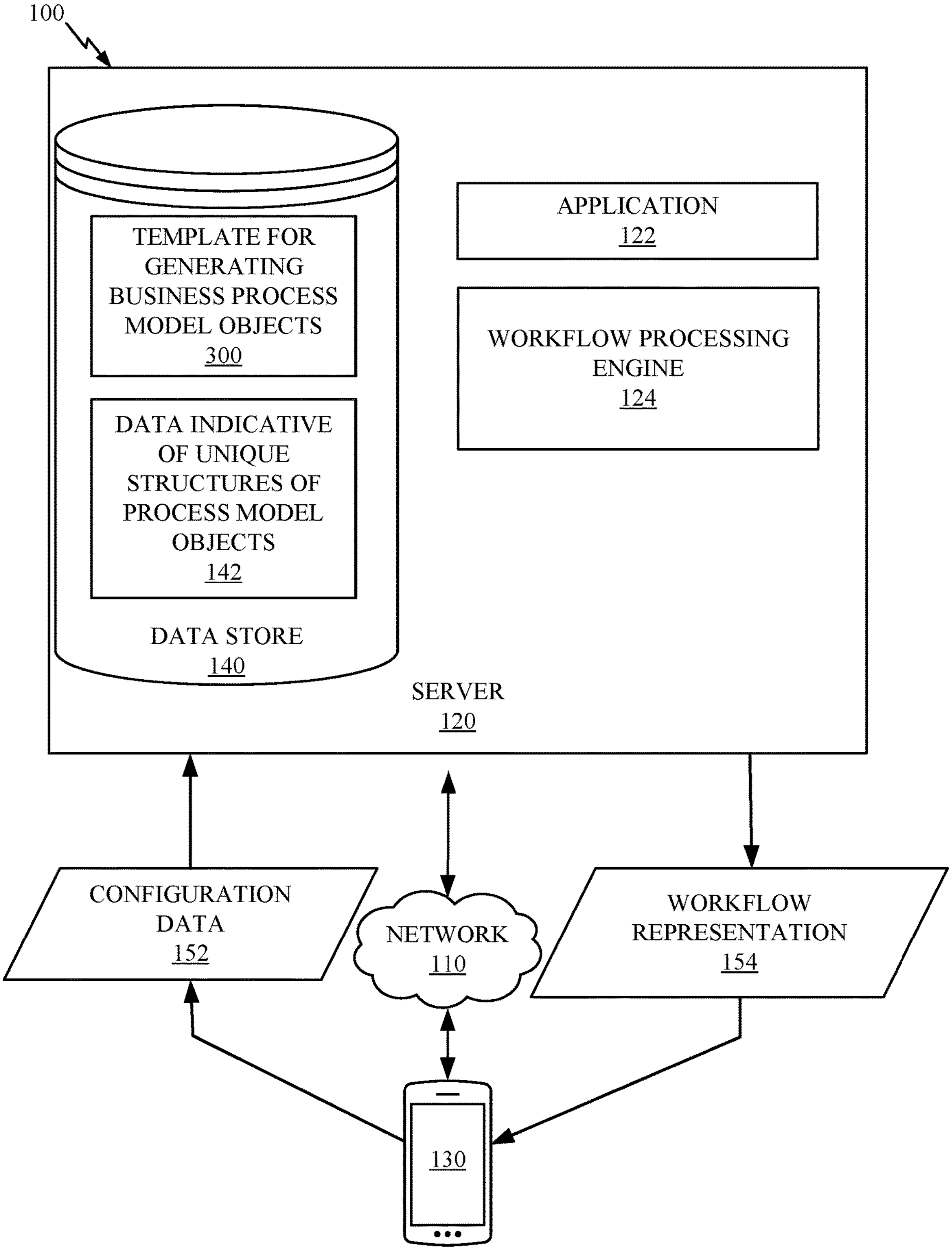
FIG. 1 depicts an example computing environment including components related to dynamically generating a process model object for workflows including multiple conditions and multiple actions according to some embodiments of the present disclosure.

Aspects of the present disclosure relate to dynamically generating a process model for a multi-condition, multi-action workflow requested in a software application and reusing the process model object when another multi-condition, multi-action workflow is requested in the software application.

Creating a workflow in a software application allows a user to automate processes and solve uses cases (e.g., approvals, reminders, notifications) according to user-specified rules. Files for created workflows may be maintained on a data store (e.g., database). The files for a created workflow includes a process model object and a decision model object. In some embodiments, a process model object may refer to a business process model and notation (BPMN) object or another similar object that maps action identifiers to details that allow the actions to be performed. A decision model object may refer to a decision model and notation (DMN) object or another similar object that specifies conditions and actions of a workflow in a sequential manner. However, given the large number (e.g., in the thousands) of multi-condition, multi-action workflows that a user can create, creating and storing a static file for every possible multi-condition, multi-action workflow, especially the process model object associated with a given multi-condition, multi-action workflow, that may be requested by a user is not feasible.

Embodiments of the present disclosure overcome this problem with multi-condition, multi-action workflows. In particular, embodiments of the present disclosure are directed to techniques in which a process model object for a requested multi-condition, multi-action workflow is dynamically generated. For example, the process model object may be dynamically generated at runtime (e.g., in real-time as the multi-condition, multi-action workflow is being requested by a user of a software application for configuring workflows) using a template (e.g., base process model object) for generating process model objects for requested multi-condition, multi-action workflows.

The template may, for example, include a single condition element or block to which the multiple conditions of the requested workflow may be mapped. The template may also include a single action element or block to which the multiple actions of the requested workflow may be mapped. The template may also include implicit information that needs to be included in every process model generated for multi-condition, multi-action workflows. For example, the implicit information may include an action that may not be included in the requested complex workflow but needs to be included in every process model object that is dynamically generated using the template.

To dynamically generate a process model object for a requested multi-condition, multi-action workflow, user-provided information (e.g., task name, email, etc.) that is extracted from configuration data associated with the requested multi-condition, multi-action workflow may be superimposed (e.g., merged) with the implicit information included in the template to dynamically generate (e.g., at run-time) the process model object for the requested multi-condition, multi-action workflow. In this manner, software applications for configuring workflows according to embodiments of the present disclosure are capable of generating multi-condition, multi-action workflows on the fly (e.g., at run-time) and are therefore improved compared to conventional software applications for configuring single-condition, single-action workflows based on static files generated for such single-condition, single-action workflows prior to run-time.

In addition to dynamically generating the process model object, a decision model object may be dynamically generated for the requested complex workflow as well. For instance, a source file for the decision model object specifying conditions and actions of the requested multi-condition, multi-action workflow in a sequential manner may be dynamically generated. Furthermore, the source file (e.g., extensible markup language file) for the decision model object may be stored on the data store.

Once generated, the process model object may be checked against a data store to determine if there is already an instance of the process model object saved on the data store. However, saving the source file (e.g., which may be an extensible markup language file) of the process model object is not preferable since the source file includes the user-specific information that would not be relevant if the generated process model object were reused for another multi-condition, multi-action workflow requested by another user. Also, querying the data store for the source file of the process model object is not performant if the source file is stored in its entirety, as searching for a length extensible markup language (XML) string is inefficient and requires large amounts of computing resources.

Embodiments of the present disclosure overcome this problem by generating data that is indicative of the process model object and, in particular, a structure (e.g., skeleton, tree, etc.) of the process model object indicating the relationship between the multiple conditions and multiple actions included in the requested workflow. For example, the structure of the dynamically generated process model object may include a plurality of nodes, and each of the nodes may correspond to a respective event included in a sequence of events to be performed based, at least in part, on the multiple conditions and the multiple actions included in the requested workflow. Furthermore, user-provided information for the requested workflow may be excluded from the structure of the process model object. In this manner, the structure of the process model object may be immune to changes to properties (e.g., values, conditions, sequences of nodes) of the dynamically generated process model object and therefore is representative of the core structure of the process model object.

In some embodiments, the structure of the process model object may be represented as an adjacency vector or list representing properties (e.g., activity identifier, type of element, existence of child nodes, etc.) of the different nodes included in the structure. The adjacency vector or list may be searched for in the data store to determine if there is already an instance of the adjacency vector or list stored in the data store. If the adjacency vector or list is not already stored in the data store, the adjacency vector or list may, for example, be serialized and converted to a unique hash value that is then saved to the data store. In this manner, the data store may be queried (e.g., searched) for the adjacency vector or list (that is, the structure of the dynamically generated process model object) in a more efficient manner and reused for other multi-condition, multi-action workflows being requested in the software application. More particularly, the structure of the dynamically generated process model object may be reused for another multi-condition, multi-action workflow having the same or similar structure.

Techniques described herein provide multiple technical improvements over existing techniques for implementing configurable workflows in software applications. For example, by dynamically generating a process model object for a requested multi-condition, multi-action workflow and saving the structure of the dynamically generated process model object to a data store so that the structure of the dynamically generated process model object may be reused to create a subsequently requested multi-condition, multi-action workflow having the same structure (e.g., skeleton), techniques disclosed herein allow complex workflows to be configured and executed in a scalable manner that could not previously be achieved.

Furthermore, by saving data indicative of the structure of the process model object as opposed to the source file for the process model object, techniques disclosed herein utilize computational resources in a more efficient manner as the database can be queried in a more efficient manner as the data indicative of the unique structure of the process model object can be retrieved from the database more efficiently than a full previously-generated process model object (e.g., which is a larger file that would contain data that is irrelevant to subsequently requested multi-condition, multi-action workflows). Additionally, storing the data indicative of the unique structure of the process model object in a serialized form (e.g., as a unique has value) in the database allows the database to be queried for an index column more efficiently than if the data were stored in a different form (e.g., in the form of a full process model object), thereby reducing computing resource utilization and improving the functioning of the computing devices involved.

Example Computing Environment for Automated Workflow Configuration

FIG. 1 illustrates an example computing environment 100 for automated workflow configuration according to embodiments of the present disclosure.

The computing environment 100 includes a server 120 and a client 130 connected over a network 110. The network 110 may be representative of any type of connection over which data may be transmitted, such as a wide area network (WAN), local area network (LAN), cellular data network, and/or the like.

The server 120 includes an application 122, which generally represents a computing application that users interact with over the network 110, such as via computing devices (e.g., a user may interact with application 122 via client 130). In some embodiments, the application 122 is accessed via a user interface associated with the client 130.

In some embodiments, the application 122 is an electronic financial accounting system that assists users in bookkeeping or other financial accounting practices. Additionally, or alternatively, the financial management system can manage one or more of tax return preparation, banking, investments, loans, credit cards, real estate investments, retirement planning, bill pay, and budgeting. In such embodiments, workflows described herein may relate to automatically performing actions (e.g., prompting a particular individual for approval) upon the occurrence of certain conditions related to financial management (e.g., when an invoice is created within the software application that has an amount over a threshold). In other embodiments, the application 122 provides other, non-financial functionality, and involves workflows that do not necessarily relate to finances. Generally, the application 122 allows users to configure workflows in which particular actions are automatically performed upon the occurrence of particular conditions. Workflows may also relate to filtering or searching through a data set, such as specifying conditions (e.g., nested or otherwise) under which results should be displayed. The application 122 can be a standalone system, or can be integrated with other software or service products provided by a service provider.

The data store 140 generally represents a data storage entity such as a database or repository that stores data relating to the application 122 and/or a workflow processing engine 124, including data 142 that is indicative of the structure of different process model objects dynamically generated for different multi-condition, multi-action workflows. For example, the data 142 may include first data indicative of a unique structure for a first process model object dynamically generated for a first multi-condition, multi-action workflow. The data 142 may further include second data indicative of a unique structure for a second process model object dynamically generated for a second multi-condition, multi-action workflow. As will be discussed later on in more detail, the data 142 may be used to facilitate reusing the process model objects for subsequently requested multi-condition, multi-action workflows having the same structure.

The workflow processing engine 124 generally provides functionality related to dynamically assisting with workflow configuration, such as performing validation on workflow configuration data and generating configuration recommendations as appropriate. While shown separately, some or all of the functionality described herein with respect to the workflow processing engine 124 may alternatively be part of the application 122 and/or may be implemented by one or more additional components.

In an example, as described in more detail below with respect to FIG. 2, a user may interact with a user interface (e.g., via the client 130) in order to configure a multi-condition, multi-action workflow for the application 122, and the resulting configuration data 152 for the multi-condition, multi-action workflow may be provided to the server 120. The configuration data 152 may specify multiple conditions and multiple actions associated with the complex workflow. It is noted that configuration data 152 may include all or part of a workflow configuration. For example, the configuration data 152 may represent an intermediate state of a workflow configuration that is processed for validation before the workflow is further configured.

The workflow processing engine 124 may then perform an efficient validation of the configuration data 152 and, if a configuration issue is detected, may generate a configuration alert and/or recommendation 154 (e.g., indicating the configuration issue and/or recommending one or more correct configuration values).

A configuration alert and/or recommendation 154 may be provided to the user via the user interface (e.g., the configuration alert and/or recommendation 154 may be sent to client 130 and displayed via the user interface on the client 130). An example of a configuration alert and/or recommendation 154 is described below with respect to FIG. 2.

Figure 2:
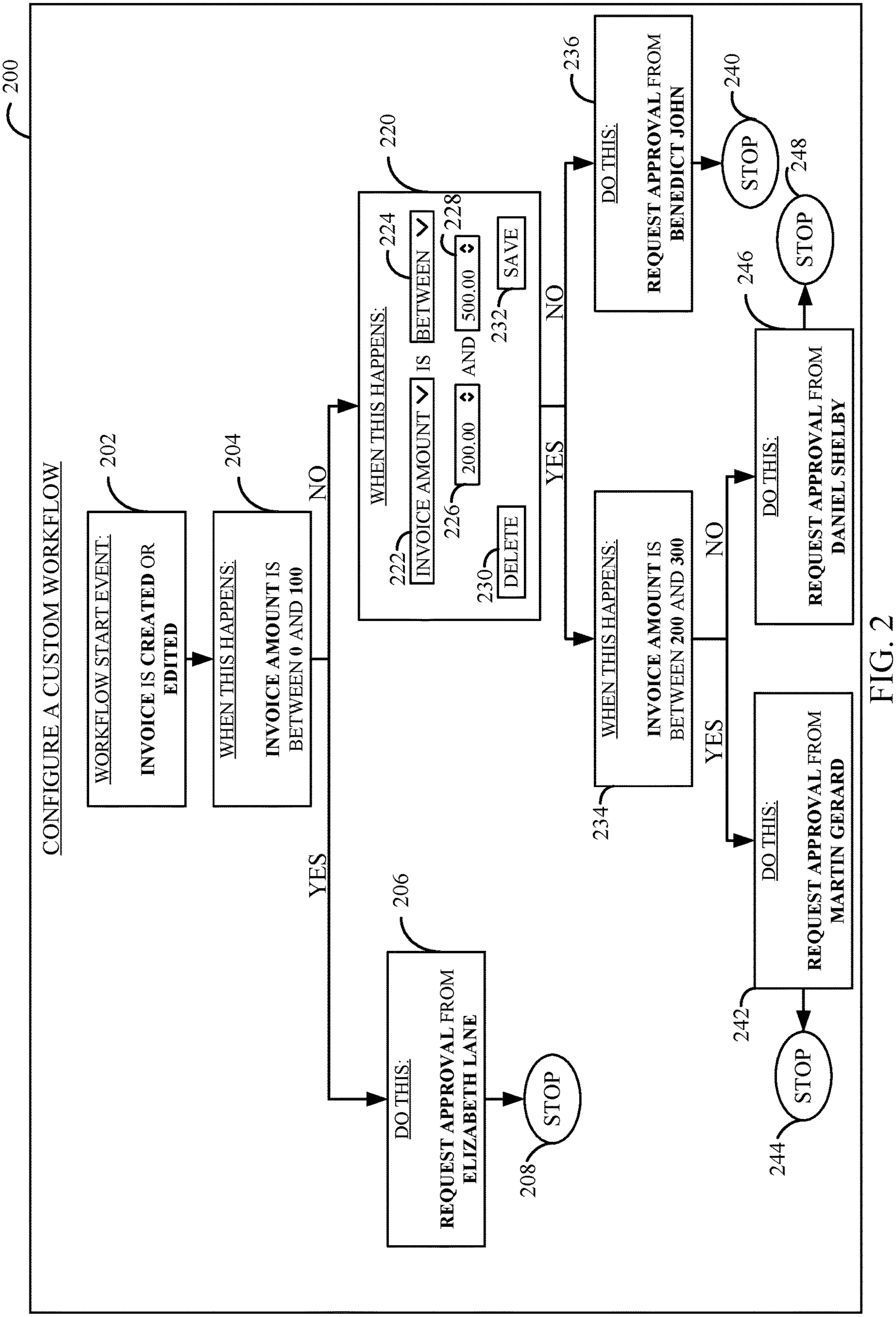
FIG. 2 depicts an example user interface relating to creating a workflow including multiple conditions and multiple actions according to some embodiments of the present disclosure.

Example User Interface Screen for Configuring a Multi-Condition Multi-Action Workflow FIG. 2 illustrates an example user interface screen 200 related to configuring a multi-condition, multi-action workflow according to some embodiments of the present disclosure. For example, the user interface screen 200 may represent a screen of the application 122 of FIG. 1 accessed via a user interface displayed on the client 130 of FIG. 1. Generally, the user interface screen 200 provides user interface controls by which a user is enabled to configure the multi-condition, multi-action workflow. In an example, the user interface screen 200 provides drag and drop functionality, such as allowing a user to drag condition elements and action elements (e.g., from a list or section of the user interface that is not shown) onto a canvas, or otherwise allows the user to specify conditions, actions, and relationships between such conditions and actions.

In the depicted example, a workflow start event 202 has been configured, indicating that the complex workflow begins when an invoice is created or edited. Following the workflow start event 202, a first condition 204 has been configured indicating an invoice amount between 0 and 100, and a “yes” path and “no” path for the first condition 204 are defined. The yes path for the first condition 204 indicates how the multi-condition, multi-action workflow should proceed when the first condition 204 is satisfied (e.g., when an invoice amount is between 0 and 100). Conversely, the no path for the first condition 204 indicates how the multi-condition, multi-action workflow should proceed when the first condition 204 is not satisfied (e.g., when an invoice amount is not between 0 and 100).

For the yes path of the first condition 204, a first action 206 has been configured, indicating that approval should be requested from a particular individual (Elizabeth Lane). The first action 206 is followed in the multi-condition, multi-action workflow by a first stop action 208, indicating that the multi-condition, multi-action workflow ends. In alternative configurations (not shown), an action could be followed by another action or condition.

For the no path of the first condition 204, a second condition 220 is currently being configured in the depicted example. Via controls 222, 224, 226, and 228, the user has selected that an invoice amount should be between 200.00 and 500.00. Controls 230 and 232 also allow the user to, respectively, delete or save the second condition 220.

The no path for the second condition 220 includes a second action 236, indicating that approval should be requested from a particular individual (Benedict John). The second action 236 is followed in the workflow by a second stop action 240, indicating that the multi-condition, multi-action workflow ends.

The yes path for the second condition 220 includes a third condition 234, which indicates an invoice amount between 200 and 300. The yes path for the third condition 234 includes an action, indicating that approval should be requested from a particular individual (Martin Gerard). A third action 242 is followed in the multi-condition, multi-action workflow by a third stop action 244, indicating that the multi-condition, multi-action workflow ends. The no path for the third condition 234 includes a fourth action 246, indicating that approval should be requested from a particular individual (Daniel Shelby). Action 236 is followed in the multi-condition, multi-action workflow by a stop action 248, indicating that the workflow ends.

According to embodiments described herein, a process model object for the multi-condition, multi-action workflow may be dynamically generated. An example of the dynamically generated process model object is described below with respect to FIG. 4. Data indicative of a structure (e.g., skeleton) of the dynamically generated process model object may then be stored in a data store (such as the data store 140 in FIG. 1). In this manner, the process model object may be reused for subsequently created multi-condition, multi-action workflows having the same structure as the multi-condition, multi-action workflow illustrated in FIG. 2.

It is noted that user interface screen 200 is included as an example, and other types of user interface screens and/or methods of receiving workflow configuration data may alternatively be employed using techniques described herein.

Figure 3:
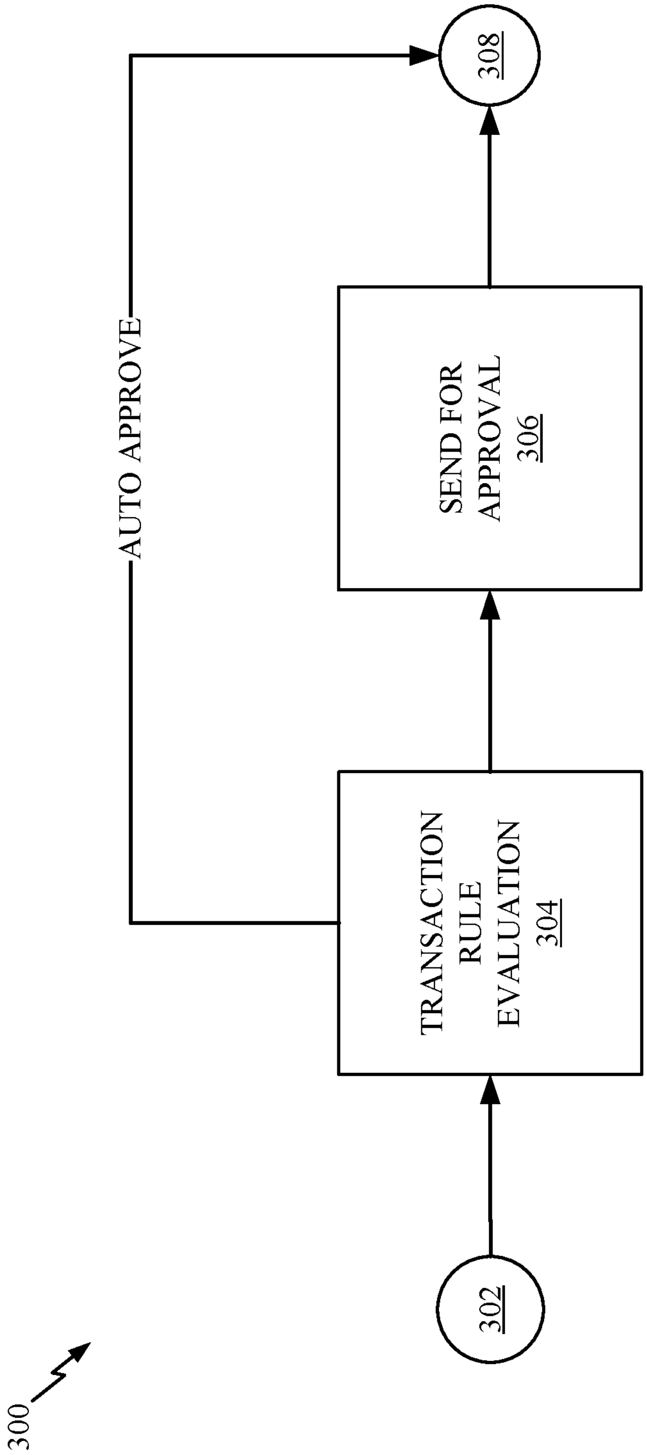
FIG. 3 depicts a template for dynamically generating process model objects for requested workflows including multiple conditions and multiple actions according to some embodiments of the present disclosure.

Example Template for Dynamically Generating Process Model Objects for Multi-Condition Multi-Action Workflows FIG. 3 illustrates a template 300 (e.g., base process model object) that may be used to dynamically generate process model objects for multi-condition, multi-action workflows according to some embodiments of the present disclosure. The template 300 may be used to dynamically generate a process model object for a multi-condition, multi-action workflow of a given type (e.g., approval workflow) and being requested in a software application. For simplicity, the template 300 will be discussed in the context of the multi-condition, multi-action workflow being requested via the user interface screen 200 illustrated in FIG. 2.

As shown, the template 300 includes an element for each of the different types of items (e.g., start, condition, action, stop) included in a multi-condition, multi-action workflow being requested in a software application. For example, the template 300 includes a start element 302 that corresponds to the workflow start event 202 depicted in FIG. 2; a transaction rule evaluation element 304 that corresponds to the different conditions 204, 220, 234 depicted in FIG. 2; a send for approval element 306 that correspond to the different actions 206, 234, 236, 242, 246 depicted in FIG. 2; and a stop element 308 that corresponds to the different stop actions (e.g., depicted as 208, 240, 244, 248) depicted in FIG. 2.

The template 300 may also include implicit information that must be included in every process model object generated with the template 300. For example, the implicit information may include one or more nodes that are not present in the requested multi-condition, multi-action workflow, such as an auto approval path (as illustrated by arrow extending from transaction rule evaluation element 304 to the stop element 308) for instances in which a transaction does not satisfy any of conditions 204, 220, 234 depicted in FIG. 2. Alternatively, or additionally, the implicit information may include data associated with one or more subprocesses that are required to perform a particular task that may not be relevant to the multi-condition, multi-action workflow being requested in the software application.

As will now be discussed in more detail, user-provided information associated with the multi-condition, multi-action workflow being requested in the software application may be superimposed (e.g., merged) with the implicit information associated with the template 300 to dynamically generate a process model object for the requested multi-condition, multi-action workflow. It should be appreciated that "user-provided information" may refer to any information provided by the user when configuring the multi-condition, multi-action workflow in the user interface of the software application. For example, "user-provided information" in the context of the multi-condition, multi-action workflow being configured in the user interface screen 200 in FIG. 2 may include "Request approval from . . . " in the actions 206, 236, 242, 246 and the "Invoice amount is . . . " in the conditions 204, 220, 234.

Figure 4:
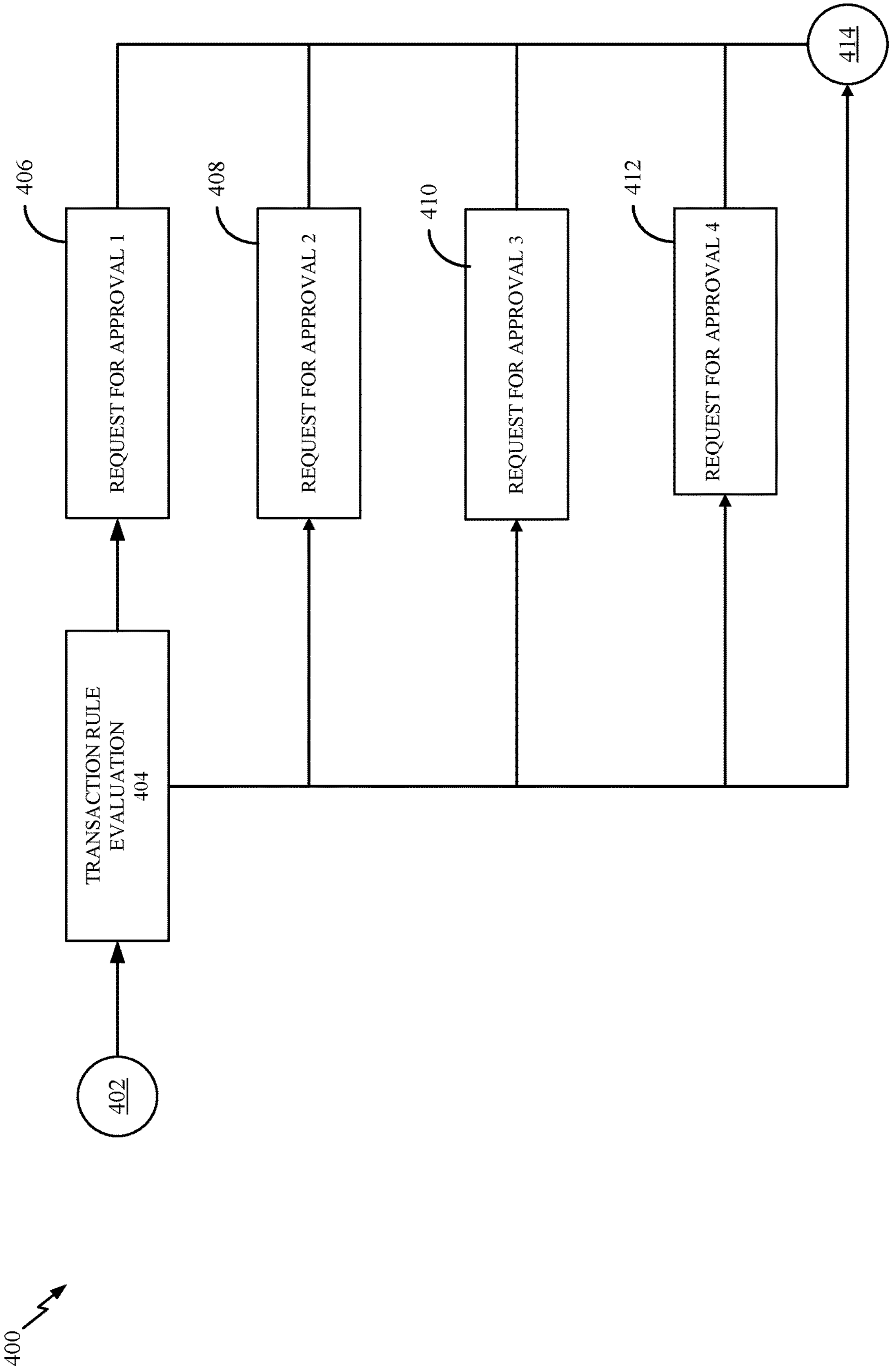
FIG. 4 depicts a dynamically generated process model object for a workflow including multiple conditions and multiple actions according to some embodiments of the present disclosure.

Example Process Model Object Dynamically Generated for a Multi-Condition, Multi-Action Workflow FIG. 4 is an illustration of a process model object 400 dynamically generated for a multi-condition, multi-action workflow of a first type (e.g., approval workflow) according to some embodiments of the present disclosure. The process model object 400 may be dynamically generated by superimposing user-provided information associated with the multi-condition, multi-action workflow being requested and implicit information associated with a template for generating process model objects for multi-condition, multi-action workflows of the first type. For simplicity, the process model object 400 will be discussed in the context of the multi-condition, multi-action workflow illustrated in FIG. 2 and the template 300 for generating process model objects illustrated in FIG. 3.

The process model object 400 may include a start element 402 that corresponds to the start element 302 depicted in FIG. 3; a transaction rule evaluation element 404 that corresponds to the transaction rule evaluation element 304 depicted in FIG. 3 as well as the different conditions 204, 22, 234 depicted in FIG. 4; a plurality of action elements 406, 408, 410, 412 that correspond to the different actions 206, 234, 236, 242, 246 depicted in FIG. 2; and a stop element 414 that corresponds to the stop element 308 element depicted in FIG. 3 and the different stop actions (e.g., depicted as 208, 240, 244, 248) depicted in FIG. 2.

In some embodiments, the transaction rule evaluation element 404 may include logic for evaluating the different conditions in the requested multi-condition, multi-action workflow to determine which particular action elements 406, 408, 410, 412 of the process model object 400 needs to be performed. For instance, in some embodiments, the transaction rule evaluation element 404 may include one or more decision model objects (not shown) that include the different conditions that need to be evaluated in order to determine which action elements needs to be executed. Furthermore, each of the action elements 406, 408, 410, 412 may include logic needed to perform the respective action.

It should be appreciated that each of the action elements 406, 408, 410, 412 may correspond to a different action included in the requested multi-condition, multi-action workflow (such as the multi-condition, multi-action workflow illustrated in FIG. 2). For example, the first action element 406 may correspond to the first action 206 that is to be performed based on evaluation of the first condition 204 included in the multi-condition, multi-action workflow being requested in the software application. The second action element 408 may correspond to the second action 236 in that is to be performed based on evaluation of the second condition 220 included in the multi-condition, multi-action workflow being requested in the software application. The third action element 410 may correspond to the third action 242 in that is to be performed based on evaluation of the third condition 234 included in the multi-condition, multi-action workflow. The fourth action element 412 may correspond to a fourth action (e.g., action 246 in FIG. 2) that is also to be performed based on evaluation of the third condition 234.

Figure 5:
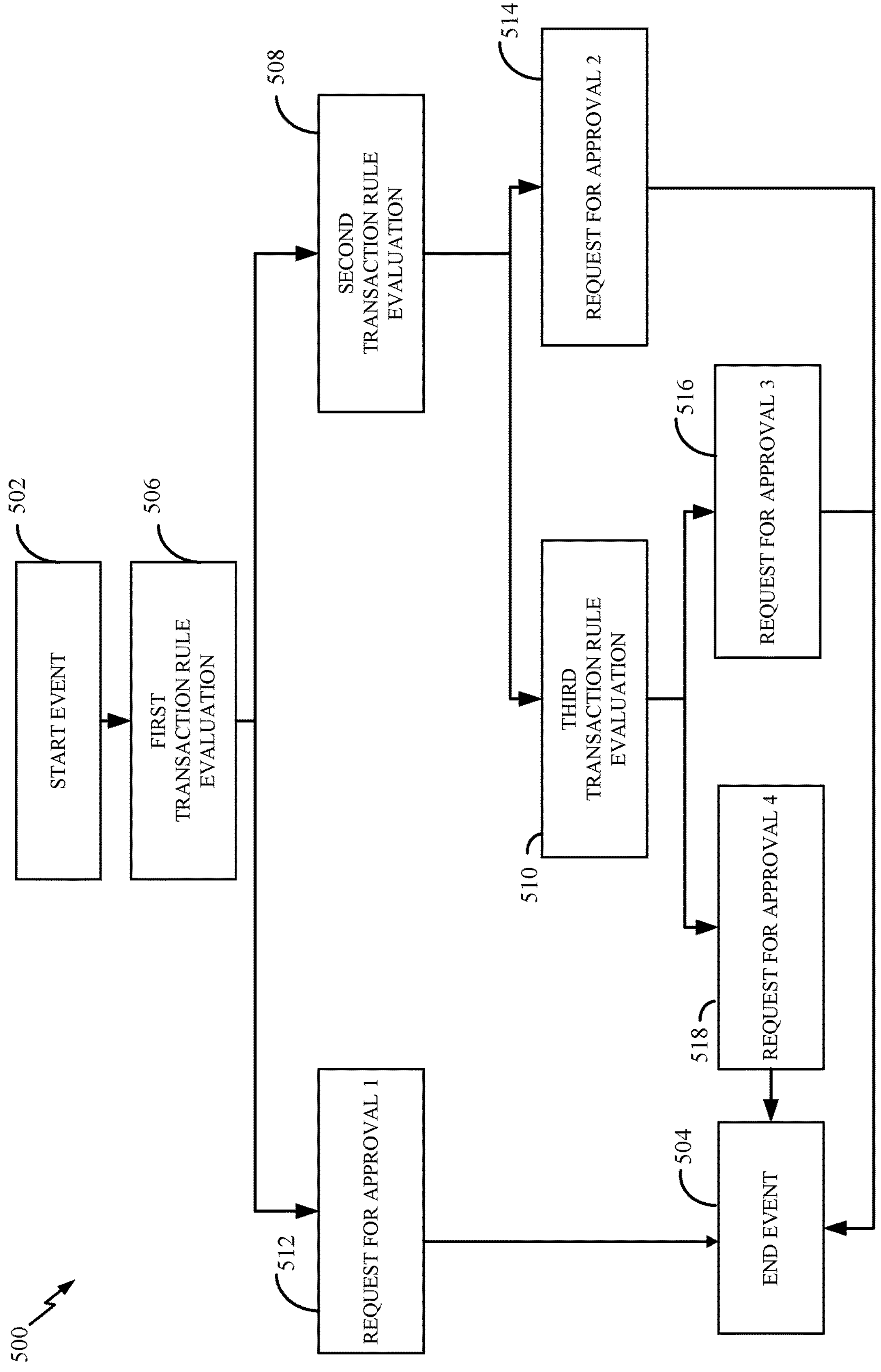
FIG. 5 depicts a structure of a dynamically generated process model object for a complex workflow of a first type according to some embodiments of the present disclosure.

Example Structure of Dynamically Generated Process Model Object for a Multi-Condition, Multi-Action Workflow FIG. 5 illustrates a structure 500 (e.g., skeleton, tree) of a dynamically generated process model object (such as the process model object 400 illustrated in FIG. 4) according to some embodiments of the present disclosure. As shown, the structure 500 includes a plurality of nodes indicating a sequence of events to be performed based, at least in part, on the multiple conditions and multiple actions included in a requested multi-condition, multi-actino workflow (such as the multi-condition, multi-action workflow illustrated in FIG. 2). The plurality of nodes includes a start node 502, an end node 504, a first condition node 506, a second condition node 508, a third condition node 510, a first action node 512, a second action node 514, a third action node 516, and a fourth action node 518.

In some embodiments, the structure 500 may include information that can be used to determine connectivity with one or more other nodes of the structure. For instance, the structure 500 may include an event identifier for each of the plurality of nodes. The event identifier may indicate what type of event (e.g., start, rule evaluation, request for approval, end) in the sequence of events is represented by the respective node. Furthermore, the structure 500 may include a list of child nodes associated with a respective node of the structure 500. For example, the second condition node 508 may include two child nodes, namely third condition node 510 and second action node 514. Also, it should be appreciated that the structure 500 does not include the user-provided information for each of the condition nodes 506, 508, 510 and action nodes 512, 514, 516, and 518.

In some embodiments, the structure 500 may be represented as an adjacency vector that can be stored on a database. For example, the adjacency vector may specify the connectivity of the plurality of nodes of the structure 500 for the dynamically generated process model object. For instance, the adjacency vector may, in some instances, include the information (e.g., event identifier, child nodes, etc.) for each of the different nodes of the structure 500.

In alternative embodiments, the structure 500 may be stored in the database as a data structure (e.g., a tree) that includes parent identifiers for each of the nodes. In this manner, the connectivity of the different nodes of the structure 500 can be determined based, at least in part, on the link between a respective node and its parent identifier (that is, a parent node of the respective node). With this particular data structure (e.g., a tree), the parent identifiers may be stored in a single row in the database. In this manner, the structure 500 (e.g., the row of parent identifiers) may be extracted from the database in a single search query.

Figure 6:
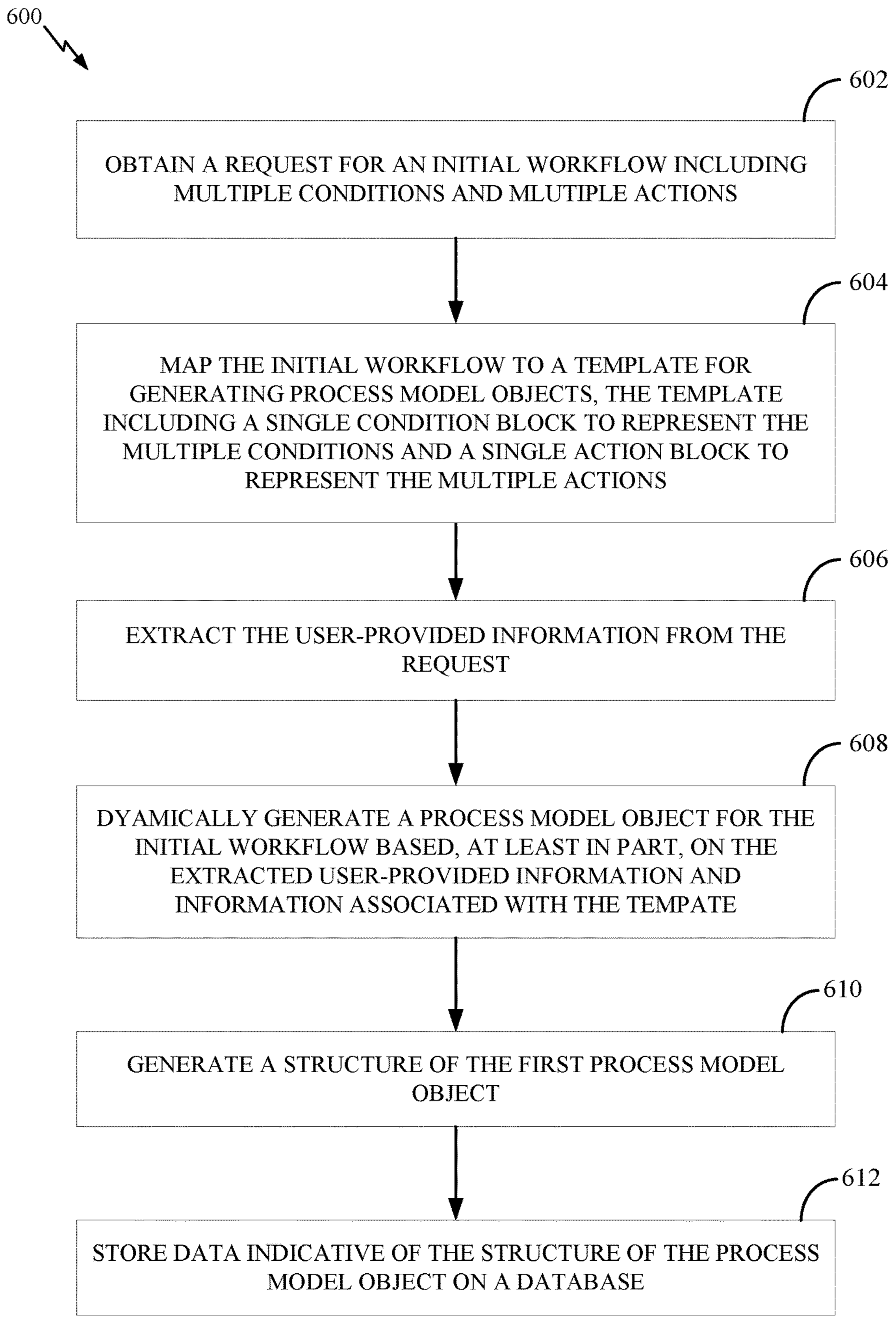
FIG. 6 depicts a method for dynamically generating a process model object for a requested workflow including multiple conditions and multiple actions according to some embodiments of the present disclosure.

Example Method for Dynamically Generating a Process Model Object for a Multi-Condition, Multi-Action Workflow FIG. 6 depicts example operations 600 related to dynamically generating a process model object for a multi-condition, multi-action workflow requested in a software application for configuring workflows according to some embodiments of the present disclosure. For example, operations 600 may be performed by one or more components described above with respect to computing environment 100 of FIG. 1.

Operation 602 includes obtaining a request for an initial workflow (such as the multi-condition, multi-action workflow illustrated in FIG. 2) including multiple conditions and multiple actions. Furthermore, the request may include user-provided information (e.g., taskName, email, etc.) for one or more of the conditions and one or more of the actions. In some embodiments, the request may be provided via a user-interface associated with a software application for generating workflows.

Operation 604 includes mapping the initial workflow to a template for generating process model objects for multi-condition, multi-action workflows. The template may include a single condition block to represent the multiple conditions and a single action block to represent the multiple actions. For instance, each of the multiple conditions included in the initial workflow requested at operation 602 may be matched to the single condition block of the template. In addition, each of the multiple actions included in the initial workflow requested at operation 602 may be matched to the single action block of the template.

Operation 606 includes extracting the user-provided information from the request for the initial workflow at operation 602. For instance, the user-provided information included for each of the multiple conditions and multiple actions may be extracted from the request obtained at operation 602. In some embodiments, the extracted user-provided information may be stored on the data store.

Operation 608 includes dynamically generating a first process model object of the initial complex workflow based, at least in part, on the user-provided information extracted at operation 606 and implicit information associated with the template to which the initial workflow requested at operation 602 is mapped at operation 604. For instance, the extracted user-provided information may be superimposed (e.g., merged) with the implicit information associated with the template to dynamically generate the process model object.

Operation 610 includes generating a unique structure (e.g., skeleton, tree) of the process model object dynamically generated at operation 608. The unique structure (such as the structure 500 illustrated in FIG. 5) may include a plurality of nodes, and each of the nodes may correspond to a respective event (e.g., start event, transaction rule evaluation event, request for approval event, end event) included in a sequence of events to be performed based, at least in part, on the multiple conditions and multiple actions included in the workflow requested at operation 602.

Operation 612 includes storing data indicative of the structure of the process model object for the initial workflow on a database. In some embodiments, the data indicative of the structure of the process model object may be represented as an adjacency vector specifying the connectivity between the nodes that make up the structure. Furthermore, the adjacency vector may exclude the user-provided information included in the request obtained at operation 602. In this manner, the adjacency vector may be unaffected by changes to properties of the process model object dynamically generated at operation 608 and therefore may represent the core structure of the process model object.

In some embodiments, storing the structure on the database may include determining whether an instance of the data indicative of the structure of the process model object is already stored on the database. For example, the database may be queried to determine whether an instance of the data (e.g., adjacency vector) is already stored on the database. If, based on the querying, it is determined that there is not an instance of the data (e.g., adjacency vector) already stored on the database, then the data (e.g., adjacency vector) may be stored in the database. Furthermore, in some embodiments, the adjacency vector may be converted to a unique hash value that is then stored on the database.

The operations 600 may further include reusing the structure of the process model object for an additional multi-condition, multi-action workflow requested (e.g., via the user-interface of the software application). In this manner, the operations 600 may allow process model objects, specifically the structure thereof that is stored on the database, to be reused for subsequent requests for multi-condition, multi-action workflows having the same structure (that is, the same sequence of events based, at least in part, on the multiple conditions and multiple actions specified for subsequent workflows). In some embodiments, operations 602, 604, 606, and 608 may be repeated for the additional multi-condition, multi-action workflow. More specifically, the structure of a process model object for the additional multi-condition, multi-action workflow may be generated and compared against the database. Then, when it is determined that the structure of the process model object for the additional multi-condition, multi-action workflow matches the structure of the process model object for the initial multi-condition, multi-action workflow requested at operation 602, the additional multi-condition, multi-action workflow may be generated using the structure of the process model object for the initial multi-condition, multi-action workflow requested at operation 602. Furthermore, since the structure of the process model object for the additional multi-condition, multi-action workflow matches the structure of the process model object dynamically generated for the initial multi-condition, multi-action workflow requested at operation 602, the structure of the process model object for the additional workflow may be discarded. In this manner, the disclosed operations 600 prevent multiple instances of the process model object, specifically the structure thereof, being stored on the database.

Example Computing Systems

Figure 7A:
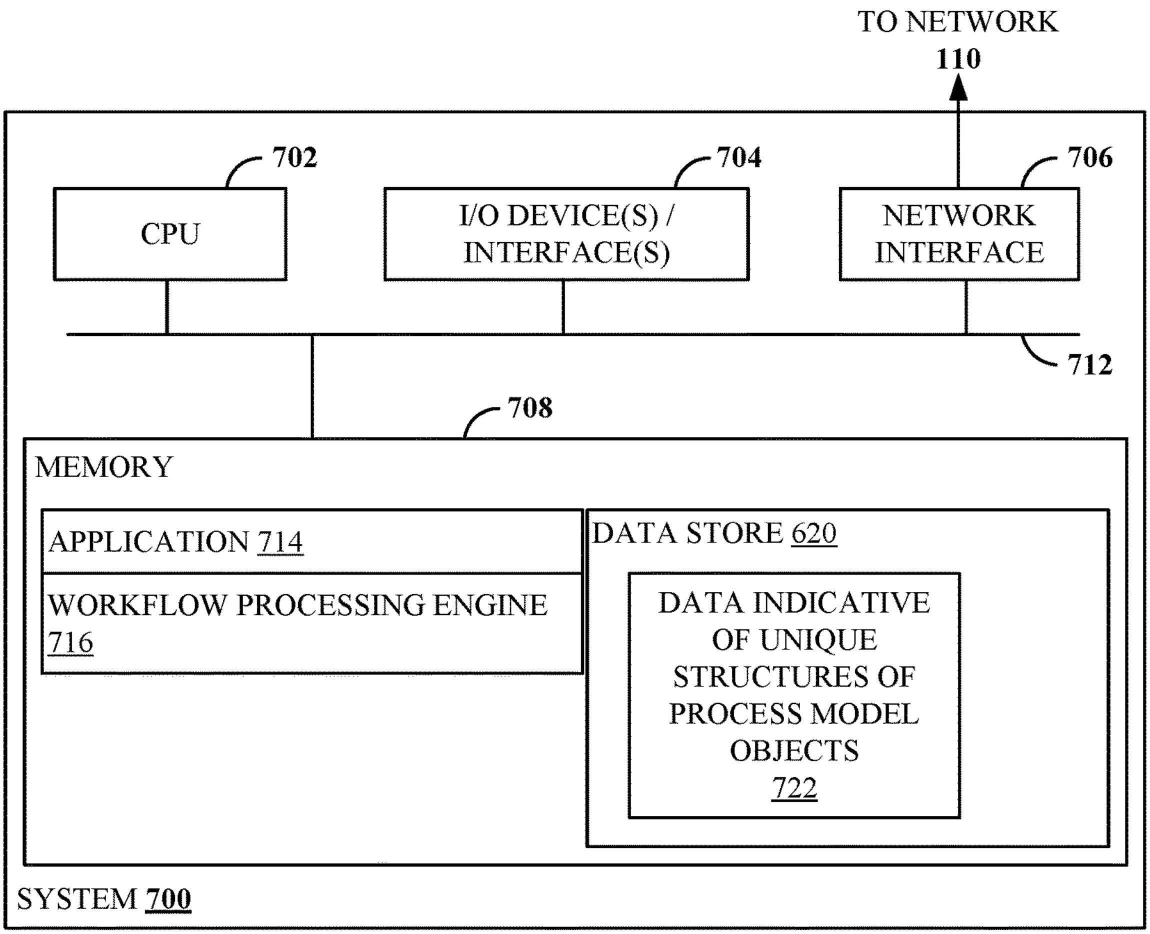
FIGS. 7A and &B depict example processing systems related to dynamically generating a process model object for workflows including multiple conditions and multiple actions according to embodiments of the present disclosure.
Figure 7B:
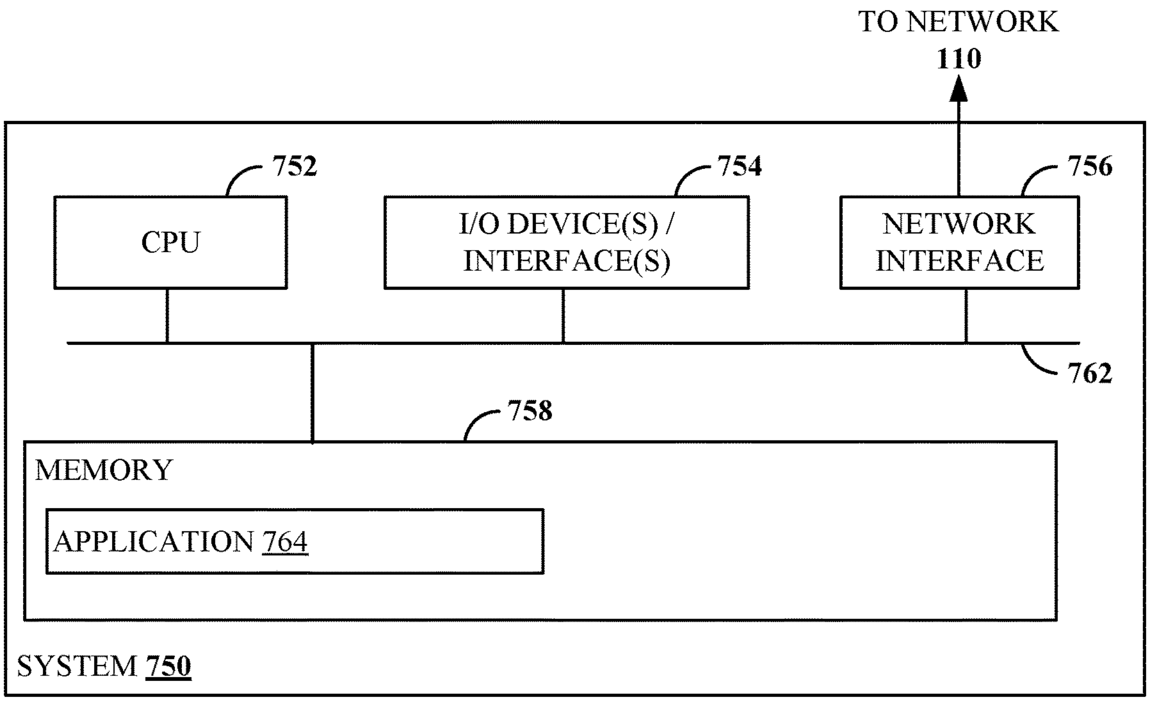

FIG. 7A illustrates an example computing system 700 with which embodiments of the disclosure related to automated workflow configuration assistance may be implemented. For example, the computing system 700 may be representative of server 120 of FIG. 1.

The computing system 700 includes a central processing unit (CPU) 702, one or more I/O device interfaces 704 that may allow for the connection of various I/O devices 704 (e.g., keyboards, displays, mouse devices, pen input, etc.) to the computing system 700, a network interface 706, a memory 708, and an interconnect 712. It is contemplated that one or more components of the computing system 700 may be located remotely and accessed via a network 710. It is further contemplated that one or more components of the computing system 700 may include physical components or virtualized components.

The CPU 702 may retrieve and execute programming instructions stored in the memory 708. Similarly, the CPU 702 may retrieve and store application data residing in the memory 708. The interconnect 712 transmits programming instructions and application data, among the CPU 702, the I/O device interface 704, the network interface 706, the memory 708. The CPU 702 is included to be representative of a single CPU, multiple CPUs, a single CPU having multiple processing cores, and other arrangements.

Additionally, the memory 708 is included to be representative of a random access memory or the like. In some embodiments, the memory 708 may include a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, the memory 708 includes application 714, workflow processing engine 716, and data store 720 including data indicative of unique structures for different process model objects 722, which may be representative of the application 122, the workflow processing engine 124, the data store 140, and the data 142 indicative of unique structures for process model objects of FIG. 1.

FIG. 6B illustrates an example computing system 750 with which embodiments of the system related to automatically recommending items for selection with a software application through machine learning may be implemented. For example, the computing system 750 may be representative of client 130 of FIG. 1.

The computing system 750 includes a central processing unit (CPU) 752, one or more I/O device interfaces 754 that may allow for the connection of various I/O devices 754 (e.g., keyboards, displays, mouse devices, pen input, etc.) to the computing system 750, a network interface 756, a memory 758, and an interconnect 760. It is contemplated that one or more components of the computing system 750 may be located remotely and accessed via a network 762. It is further contemplated that one or more components of the computing system 750 may include physical components or virtualized components.

The CPU 752 may retrieve and execute programming instructions stored in the memory 758. Similarly, the CPU 752 may retrieve and store application data residing in the memory 758. The interconnect 760 transmits programming instructions and application data, among the CPU 752, the I/O device interface 754, the network interface 756, the memory 758. The CPU 752 is included to be representative of a single CPU, multiple CPUs, a single CPU having multiple processing cores, and other arrangements.

Additionally, the memory 758 is included to be representative of a random access memory or the like. In some embodiments, the memory 758 may include a disk drive, solid state drive, or a collection of storage devices distributed across multiple storage systems. Although shown as a single unit, the memory 658 may be a combination of fixed and/or removable storage devices, such as fixed disc drives, removable memory cards or optical storage, network attached storage (NAS), or a storage area-network (SAN).

As shown, the memory 758 may include an application 764, such as a user-side application (e.g., comprising a user interface) discussed above with respect to the client 130 of FIG. 1.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for dynamically generating process model objects for workflows, the method comprising:
- obtaining a request from a user of a software application for configuring workflows, the request being for an initial workflow including multiple conditions and multiple actions, the request including user-provided information for one or more of the multiple conditions and one or more of the multiple actions;
- mapping the initial workflow to a template for generating process model objects for workflows, the template comprising a single condition block to represent the multiple conditions and a single action block to represent the multiple actions, wherein the mapping comprises matching each of the multiple conditions to the single condition block and matching each of the multiple actions to the single action block;
- extracting the user-provided information from the request; and
- dynamically generating a process model object for the initial workflow based, at least in part, on the extracted user-provided information and information associated with the template, wherein dynamically generating the process model object comprises superimposing the extracted user-provided information with implicit information associated with the template; and
- generating a structure of the process model object, the structure including a plurality of nodes each corresponding to a respective event included in a sequence of events to be performed based, at least in part, on the multiple conditions and the multiple actions, wherein the structure excludes the user-provided information and is represented by an adjacency vector specifying connectivity between the plurality of nodes;
- querying a database to determine whether an instance of the adjacency vector is already stored in the database; and
- in response to determining that the instance of the adjacency vector is not already stored in the database, serializing the adjacency vector, converting the serialized adjacency vector to a unique hash value, and storing the unique hash value in the database.

2. The method of claim 1, wherein the information associated with the template comprises implicit information for one or more sub-processes associated with the single condition block or one or more sub-processes associated with the single action block.

3. The method of claim 1, further comprising:
- obtaining a request for an additional workflow including multiple conditions and multiple actions;
- reusing the structure of the process model object for the initial workflow to generate the additional workflow.

4. The method of claim 3, further comprising:
- generating a structure of a process model object for the additional workflow;
- determining the structure of the process model object for the additional workflow matches the structure of the process model object for the initial workflow; and
- in response to the determining, reusing the structure of the process model object for the initial workflow to generate the additional workflow.

5. The method of claim 4, further comprising:

discarding the structure of the process model object for the additional workflow.

6. The method of claim 1, wherein the process model object for the initial workflow comprises a serialized graph.

7. The method of claim 1, wherein obtaining the request for the initial workflow comprises obtaining the request via user-input provided via a graphical user interface associated with the software application.

8. A system comprising:

a memory including computer executable instructions; and a processor configured to execute the computer executable instructions and cause the system to:

obtain a request from a user of a software application for configuring workflows, the request being for an initial workflow including multiple conditions and multiple actions, the request including user-provided information for one or more of the multiple conditions and one or more of the multiple actions;

map the initial workflow to a template for generating process model objects for workflows, the template comprising a single condition block to represent the multiple conditions and a single action block to represent the multiple actions, wherein to map the initial workflow to the template, the processor is configured to match each of the multiple conditions to the single condition block and match each of the multiple actions to the single action block;

extract the user-provided information from the request;

dynamically generate a process model object for the initial workflow based, at least in part, on the extracted user-provided information and information associated with the template, wherein to dynamically generate the process model object for the initial workflow, the processor is configured to superimpose the extracted user-provided information with implicit information associated with the template;

generate a structure of the process model object, the structure including a plurality of nodes each corresponding to a respective event included in a sequence of events to be performed based, at least in part, on the multiple conditions and the multiple actions, wherein the structure excludes the user-provided information and is represented by an adjacency vector specifying connectivity between the plurality of nodes;

query a database to determine whether an instance of the adjacency vector is already stored in the database; and in response to determining that the instance of the adjacency vector is not already stored in the database, serialize the adjacency vector, convert the serialized adjacency vector to a unique hash value, and store the unique hash value in the database.

9. The system of claim 8, wherein the information associated with the template comprises implicit information for one or more sub-processes associated with the single condition block or one or more sub-processes associated with the single action block.

10. The system of claim 8, wherein the processor is configured to execute the computer executable instructions and further cause the system to:

obtain a request for an additional workflow including multiple conditions and multiple actions; and reuse the structure of the process model object for the initial workflow to generate the additional workflow.

11. The system of claim 10, wherein the processor is configured to execute the computer executable instructions and further cause the system to:

generate a structure of a process model object for the additional workflow;

determine the structure of the process model object for the additional workflow matches the structure of the process model object for the initial workflow; and in response to the determining, reuse the structure of the process model object for the initial workflow to generate the additional workflow.

12. The system of claim 11, wherein the processor is configured to execute the computer executable instructions and further cause the system to:

discard the structure of the process model object for the additional workflow.

13. A non-transitory computer-readable medium comprising instructions to be executed in a computer system to dynamically generate complex workflows, wherein the instructions when executed in the computer system cause the computer system to:

obtain a request from a user of a software application for configuring workflows, the request being for an initial workflow including multiple conditions and multiple actions, the request including user-provided information for one or more of the multiple conditions and one or more of the multiple actions;

map the initial workflow to a template for generating process model objects for workflows, the template comprising a single condition block to represent the multiple conditions and a single action block to represent the multiple actions, wherein to map the initial workflow to the template, the computing system is configured to match each of the multiple conditions to the single condition block and match each of the multiple actions to the single action block;

extract the user-provided information from the request;

dynamically generate a process model object for the initial workflow based, at least in part, on the extracted user-provided information and information associated with the template, wherein to dynamically generate the process model object for the initial workflow, the computing system is configured to superimpose the extracted user-provided information with implicit information associated with the template;

generate a structure of the process model object, the structure including a plurality of nodes each corresponding to a respective event included in a sequence of events to be performed based, at least in part, on the multiple conditions and the multiple actions, wherein the structure excludes the user-provided information and is represented by an adjacency vector specifying connectivity between the plurality of nodes;

query a database to determine whether an instance of the adjacency vector is already stored in the database; and in response to determining that the instance of the adjacency vector is not already stored in the database, serialize the adjacency vector, convert the serialized adjacency vector to a unique hash value, and store the unique hash value in the database.

* * * * *